(12) United States Patent
Birsching

(10) Patent No.: US 11,305,811 B2
(45) Date of Patent: *Apr. 19, 2022

(54) STEERING SYSTEM WITH MAGNETIC TORQUE OVERLAY LASH COMPENSATION

(71) Applicant: Steering Solutions IP Holding Corporation, Saginaw, MI (US)

(72) Inventor: Joel E. Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/436,327

(22) Filed: Jun. 10, 2019

(65) Prior Publication Data

US 2019/0300049 A1   Oct. 3, 2019

Related U.S. Application Data

(63) Continuation of application No. 15/364,695, filed on Nov. 30, 2016, now Pat. No. 10,351,167.

(Continued)

(51) Int. Cl.
 *B62D 5/065* (2006.01)
 *B62D 5/083* (2006.01)
 (Continued)

(52) U.S. Cl.
 CPC ........... *B62D 5/065* (2013.01); *B62D 5/0835* (2013.01); *B62D 5/09* (2013.01); *B62D 5/24* (2013.01)

(58) Field of Classification Search
 None
 See application file for complete search history.

(56) References Cited

U.S. PATENT DOCUMENTS 3,831,697 A   8/1974   Wahlmark
6,152,254 A   11/2000  Phillips
(Continued)

FOREIGN PATENT DOCUMENTS

CN   102673641 A   9/2012
CN   103770830 A   5/2014
(Continued)

OTHER PUBLICATIONS

English Translation of Chinese Office Action and Search Report for Chinese Application No. 20161127309.1 dated Aug. 21, 2018, 12 pages.

(Continued)

*Primary Examiner* — Thomas E Worden
(74) *Attorney, Agent, or Firm* — Dickinson Wright PLLC

(57) ABSTRACT

Technical solutions for compensating for lash in a steering system are described. An example method includes determining a rack pressure value based on a driver torque value and a differential pressure across a rack of the steering system. The method also includes determining a compensation friction value based on a position of a handwheel of the steering system and a speed of a vehicle equipped with the steering system. The method also includes computing a pressure value based on the rack pressure value and the compensation friction value. The method also includes generating a torque command using the pressure value, the torque command being added to the driver assist torque for the steering system.

15 Claims, 8 Drawing Sheets

Related U.S. Application Data

(60) Provisional application No. 62/265,176, filed on Dec. 9, 2015.

(51) Int. Cl.
   *B62D 5/09* (2006.01)
   *B62D 5/24* (2006.01)

(56) References Cited

U.S. PATENT DOCUMENTS

| | | | |
|---|---|---|---|
| 9,409,595 | B2 | 8/2016 | Varunjikar |
| 9,574,972 | B2 | 2/2017 | Oblizajek |
| 10,351,167 | B2* | 7/2019 | Birsching .............. B62D 5/065 |
| 2003/0000765 | A1 | 1/2003 | Spadafora |
| 2005/0247151 | A1 | 11/2005 | Yamamoto |
| 2008/0243340 | A1* | 10/2008 | Hung ....................... B62D 5/09 |
| | | | 701/42 |
| 2015/0120134 | A1 | 4/2015 | Kanou |
| 2015/0203148 | A1 | 7/2015 | Kuramitsu |
| 2016/0221605 | A1* | 8/2016 | Pregniard .......... B62D 15/0235 |
| 2017/0096162 | A1 | 4/2017 | Fuechsel |

FOREIGN PATENT DOCUMENTS

| | | |
|---|---|---|
| CN | 104029715 A | 9/2014 |
| DE | 10032183 A1 | 1/2002 |
| DE | 102012022801 A1 | 5/2014 |
| WO | 2015036675 A1 | 3/2015 |

OTHER PUBLICATIONS

German Office Action for German Application No. 102016123454.0 dated Jan. 7, 2019, 10 pages, English Translation included.

Chinese Office Action for related Chinese Application No. 201611273091.1; dated Jun. 4, 2019; 6 pages.

* cited by examiner

STEERING SYSTEM WITH MAGNETIC TORQUE OVERLAY LASH COMPENSATION

CROSS-REFERENCES TO RELATED APPLICATIONS

This patent application claims priority to U.S. Provisional Patent Application Ser. No. 62/265,176, filed Dec. 9, 2015, and also to U.S. patent application Ser. No. 15/364,695, filed Nov. 30, 2016, both of which are incorporated herein by reference in entirety.

BACKGROUND

The present application relates to vehicle steering systems, and particularly for eliminating a degradation of steering-feel in case of a lash being present between a steering wheel and road wheels of a vehicle.

Typically, a steering system of a vehicle, such as a hydraulic steering system, uses a power steering pump to provide pressurized hydraulic fluid to either a recirculating ball style steering gear or a rack and pinion style steering gear. The steering system provides an assistive torque (or assist) to a driver during driving. A level of assist provided is determined by an amount of torque applied by the driver to a steering valve integrated into the steering gear. A resulting movement of a steering linkage in the vehicle results in angulation of the steerable wheels of the vehicle, thus steering the vehicle. The steerable wheels may be front wheels and/or rear wheels. It is desirable in a steering system to have a lash free connection between the steering wheel and the road wheels, especially in the center position of the steering wheel.

SUMMARY

According to one or more embodiments, a method for compensating for lash in a steering system includes determining a rack pressure value based on a driver torque value and a differential pressure across a rack of the steering system. The method also includes determining a compensation friction value based on a position of a handwheel of the steering system and a speed of a vehicle equipped with the steering system. The method also includes computing a pressure value based on the rack pressure value and the compensation friction value. The method also includes generating a torque command using the pressure value, the torque command being added to the driver assist torque for the steering system.

According to one or more embodiments, a steering system includes a control module that determines a rack pressure value based on a driver torque value and a differential pressure across a rack of a steering gear. The control module also determines a compensation friction value based on a position of a handwheel of the steering system and a vehicle speed. The control module also computes a pressure value based on the rack pressure value and the compensation friction value. Further, the control module generates a torque command using the pressure value, the torque command being added to a driver assist torque for the steering system.

According to one or more embodiments, a power steering system is configured to determine a rack pressure value based on a driver torque value and a differential pressure across a rack of a steering gear of the power steering system. The power steering system also determines a center friction value based on a usage parameter of the power steering system. The power steering system also determines a compensation friction value based on a position of a handwheel of the steering system, a vehicle speed, and the center friction value. The power steering system also computes a pressure value based on the rack pressure value and the compensation friction value. The power steering system further generates a torque command using the pressure value to compensate for a lash in the steering gear, the torque command being added to a driver assist torque for the power steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
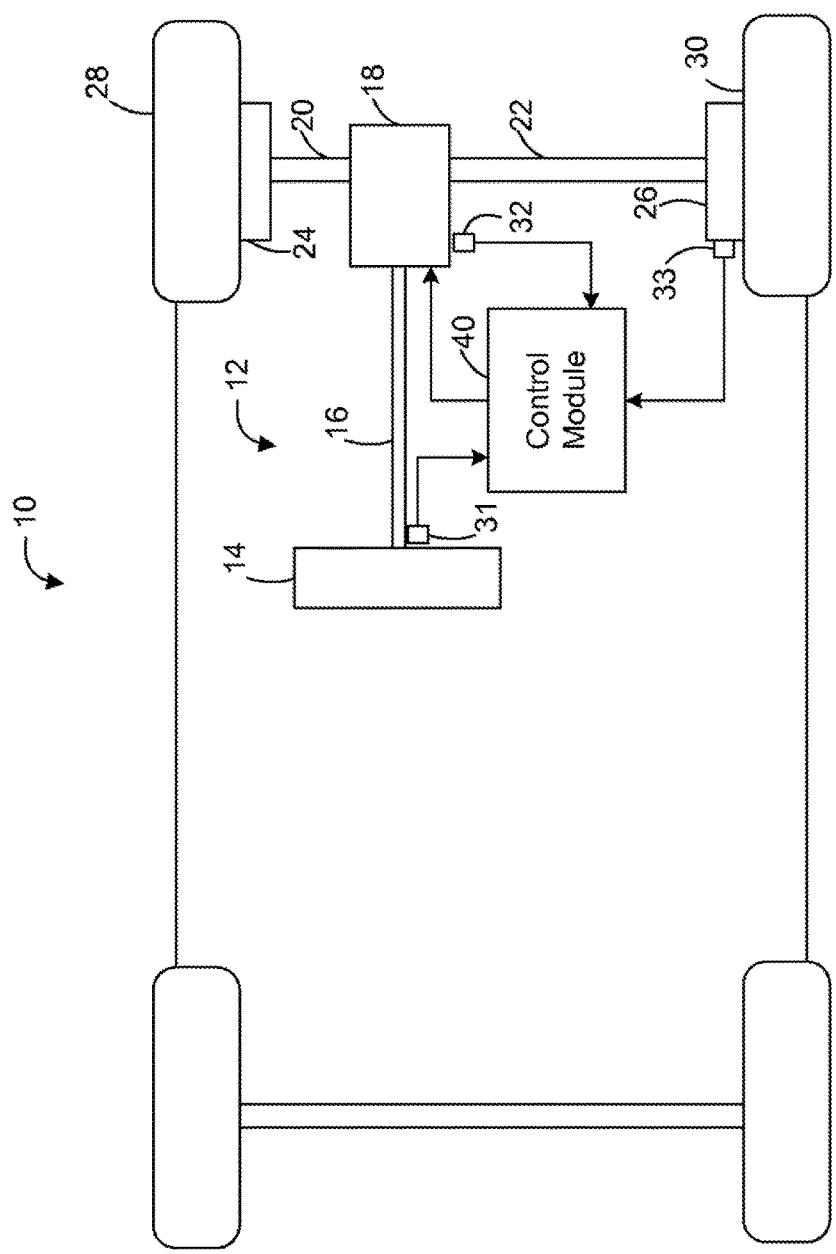
FIG. 1 is an exemplary embodiment of a vehicle including a steering system, according to one or more embodiments.

Referring now to the Figures, where the invention will be described with reference to specific embodiments, without limiting same, FIG. 1 is an exemplary embodiment of a steering system 10, such as a hydraulic steering system, in a vehicle. In various embodiments, the steering system 12 includes a handwheel 14 coupled to a steering shaft 16. In one or more examples, a steering assist unit 18 couples to the steering shaft 16 of the steering system 12 and to tie rods 20, 22 of the vehicle 10. The steering assist unit 18 includes, for example, an integral steering gear, torsion-bar type of hydraulic assist system that furnishes power to reduce turning effort at the handwheel 14. For example, during operation, as the handwheel 14 is turned by a vehicle operator, the steering assist unit 18 provides assistance to move the tie rods 20, 22 which in turn moves steering knuckles 24, 26, respectively, coupled to roadway wheels 28, 30, respectively of the vehicle 10.

In one or more examples, the vehicle 10 further includes various sensors 31, 32, 33 that detect and measure observable conditions of the steering system 12 and/or of the vehicle 10. The sensors 31, 32, 33 generate sensor signals based on the observable conditions. For example, the sensor 31 is a position sensor that senses the angle of rotation of the handwheel 14 by the operator of the vehicle 10. The position sensor generates a handwheel angle signal based thereon. The sensor 32 is a differential pressure sensor that senses assist provided by the steering assist unit. The sensor 32 generates a differential pressure signal based thereon. In yet another example, the sensor 33 is a vehicle speed sensor that senses a rotational speed of the wheel 30. The sensor 33 generates a vehicle speed signal based thereon. A control module 40 controls the operation of the steering system 12 based on one or more of the sensor signals and further based on the steering control systems and methods of the present disclosure.

Figure 2:
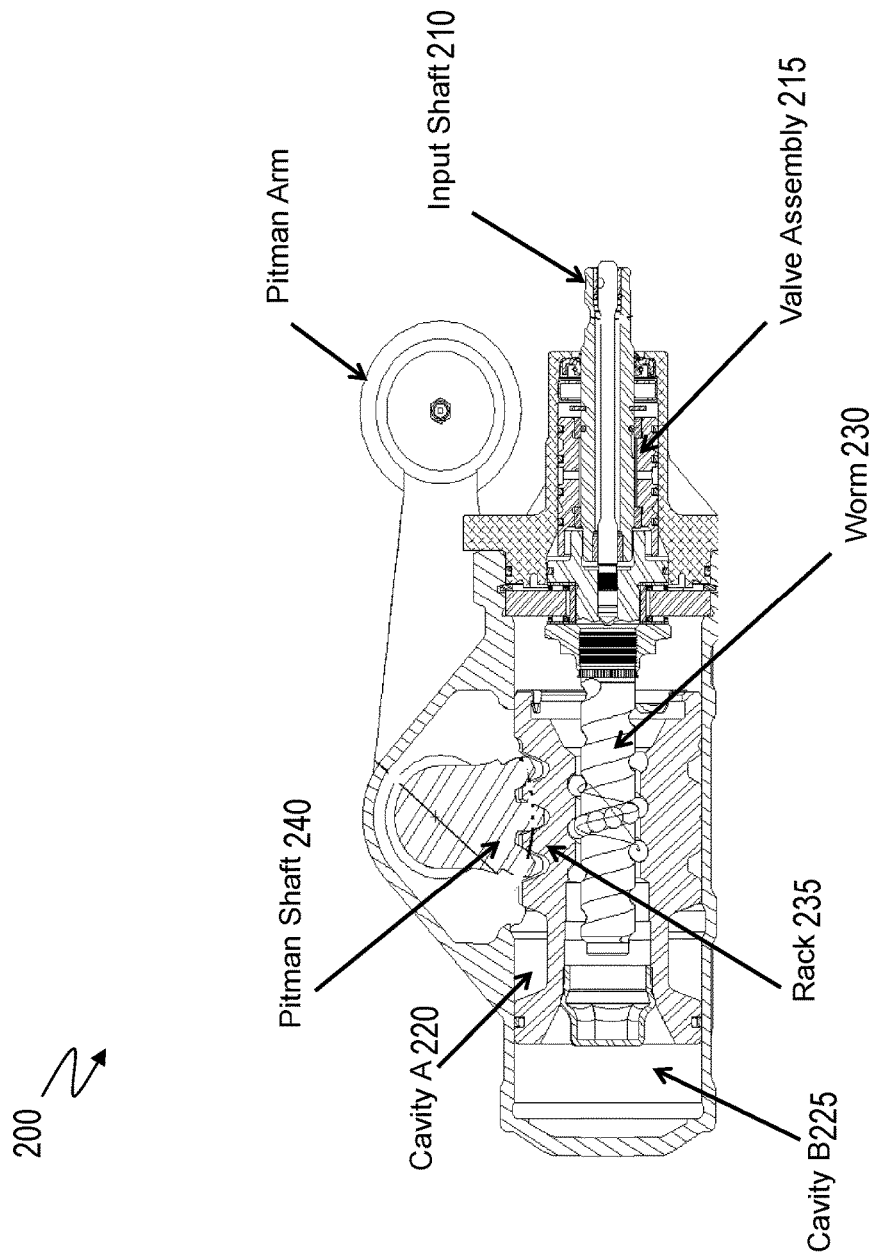
FIG. 2 illustrates a cross section of a recirculating ball steering gear 200, according to one or more embodiments.

Referring now to FIG. 2, a cross section of a recirculating ball steering gear 200 is illustrated. The gear 200 has an input shaft 210 that is operably connected to the steering wheel 14 of the vehicle. When a torque is applied to the input shaft 210, a valve assembly 215 is actuated to provide assist pressure in either cavity A 220, or cavity B 225, depending on a direction of the torque, to assist in steering the vehicle. A worm 230, which is attached to the bottom of the valve assembly 215, provides a thrust force on a rack 235. When the valve assembly 215 is rotated in the steering gear 200, the rack 235 translates in a rack bore along the axis of the worm 230. The rack 235 has teeth which mate with teeth on a pitman shaft 240. When the rack 235 moves axially in the rack bore, the pitman shaft 240 rotates along its axis. A pitman arm, which is attached to the bottom of the pitman shaft 240, connects the pitman shaft 240 to a linkage in the vehicle. For example, the linkage may include the tie rods 20, 22, the steering knuckles 24, 26, and/or other components that facilitate transferring the force from the steering wheel 14 to the roadway wheels 28, 30. Accordingly, when the pitman arm rotates, the pitman arm swings through an arc, and this, in turn, moves the steering linkage in the vehicle, resulting in angulation of the wheels 28, 30 in order to steer the vehicle.

The technical solutions described herein facilitate the steering system 10 to have a lash free connection between the steering wheel 14 and the road wheels 28, 30. A lash-free connection facilitates the steering system 10 to improve a steering feel for the driver, especially in the on-center position of the steering wheel 14. Typically, for providing a lash free connection, the teeth on the pitman shaft 240 are manufactured with a taper. An adjuster mechanism (not shown) positions the pitman shaft 240 along its axis in order to remove any clearance between the pitman shaft teeth and the rack teeth. Further, to account for normal wear in the gear assembly, it is common to make the center tooth thicker than the outer teeth. When initially adjusted, with no hydraulics applied, the torque required to rotate such a gear assembly 100 is higher on-center than in the corners. Even with the initial preload on-center, normal wear in the steering gear 100 leads to lash conditions in the gear 100 that deteriorate the steering feel and functionality of the steering system 10. Accordingly, it may be necessary to adjust the gear 100 in service, in order to remove or reduce the lash that has developed. The technical solutions described herein address the above described technical solution to provide a lash free connection, which is free of the loading conditions that lead to the lash-conditions described above.

Further, a steering system with magnetic torque overlay incorporates a magnetic actuator into the valve assembly 215 to enable controlling operations on a hydraulic system of the steering system. The operations may include variable effort, leads and pulls correction, active damping, active return, and the like or a combination thereof. The steering system equipped with the magnetic torque may be referred to as a Magnasteer with Torque Overlay (MTO) system.

Figure 3:
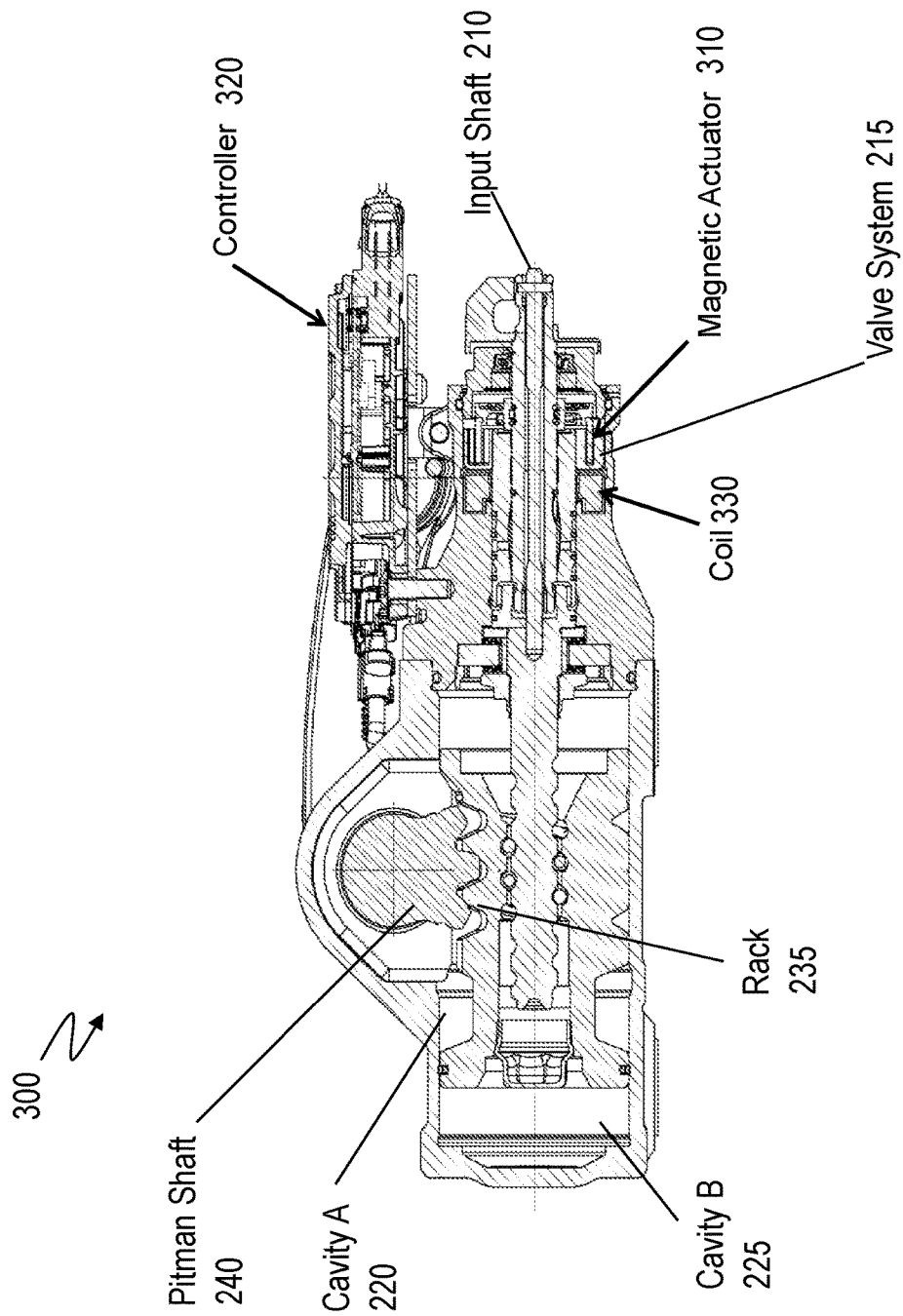
FIG. 3 shows a cross section of an MTO recirculating ball steering gear, according to one or more embodiments.

FIG. 3 shows a cross section of an MTO recirculating ball steering gear 300. As can be seen, the assist and the connection from the steering wheel and the road wheels are functionally the same as a base gear (shown in FIG. 2). The MTO gear 300 has a magnetic actuator 310 incorporated into the valve assembly 215, to provide additional effort to aid, or to resist the driver during certain steering conditions. In these conditions, a controller 320 provides current to a coil 330, which determines the amount of torque provided by the magnetic actuator 310. In one or more embodiments, the controller 320 may be part of the control module 40 (FIG. 1).

Figure 4:
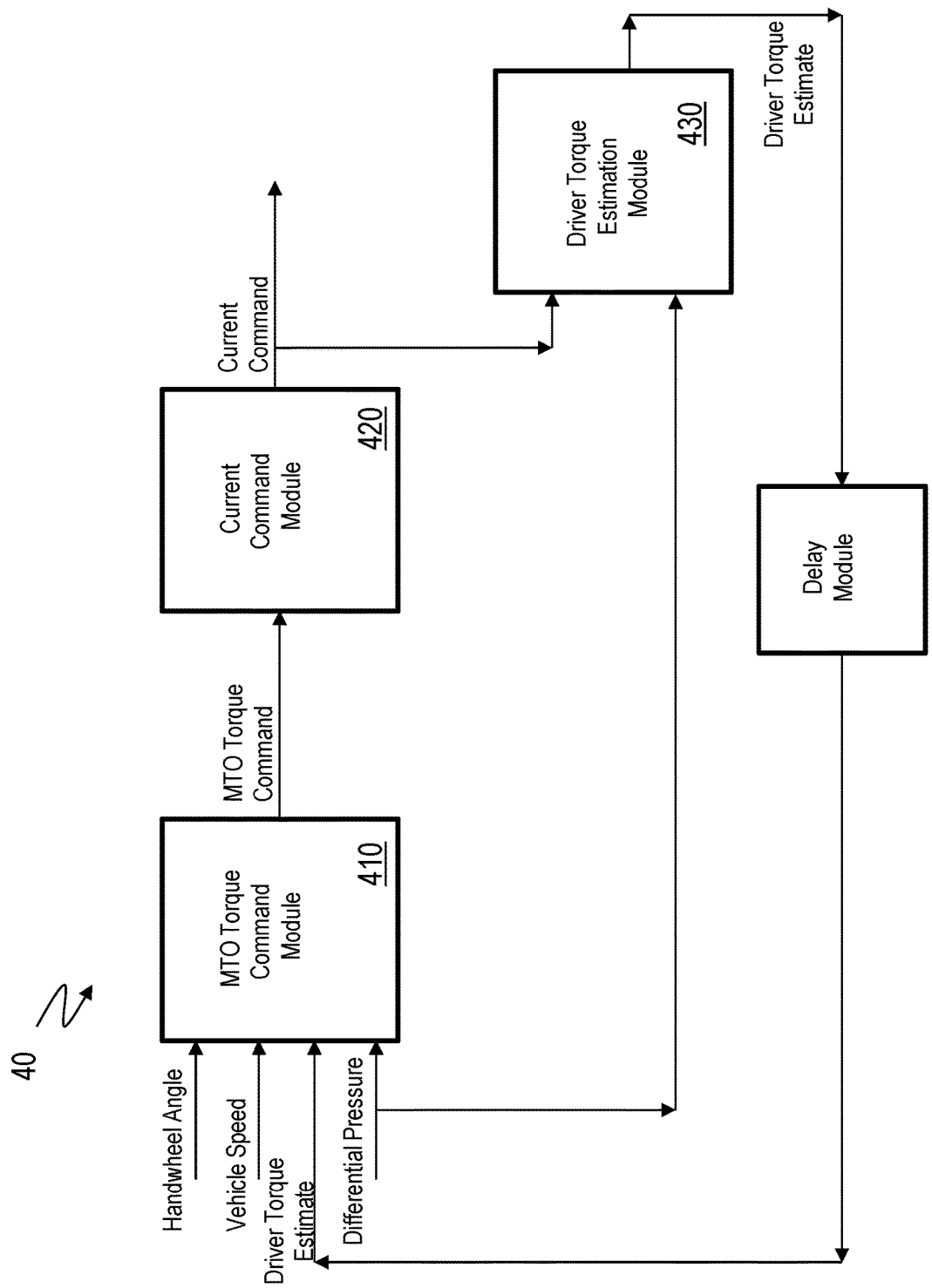
FIG. 4 shows a block diagram of controls of an MTO equipped steering system, according to one or more embodiments.

FIG. 4 shows a high level block diagram of controls of the MTO equipped steering system 10. The MTO steering system 10 includes an MTO Torque command module 410 that receives multiple input signals. For example, the input signals include a measurement of a differential pressure across the piston in the steering system 10. The input signals may further include vehicle signals such as vehicle speed, hand wheel speed, and hand wheel angle, and an estimation of driver torque. The MTO Torque Command Module 410 uses the input signals to generate a desired MTO torque command.

The torque command is provided to a current command module 420, which converts the torque command into a current command. The current command is applied to the magnetic actuator coil 330 in the MTO steering gear 300. A driver torque estimation module 430 determines, or computes, a driver torque estimate based on the current command along with the measured differential pressure. The determined driver torque estimate is used in a next iteration, such as after a unit delay. In one or more embodiments, a delay module 440 facilitates delaying the driver torque estimate for use in the next iteration.

However in the MTO steering system 10 such as the above, the lash in the gear 300 is still controlled by the same mechanical features, is subject to the same normal wear as described herein, and thus fails to address the corresponding technical problems. As a result, the development of lash has the same undesirable effects on the steering feel, requiring to be adjusted in service.

Accordingly, technical solutions described herein provide a lash compensation for the MTO steering system, thus facilitate improvements to a steering feel in the case where lash has developed in steering gear of the steering system. Thus, the technical solutions address the technical problems of lash conditions associated with steering gear of a steering system.

Referring back to FIG. 3 that shows a cross section of an MTO recirculating ball steering gear 300, when a torque is applied to the input shaft 210, motion of the rack 235 is resisted by friction of the rack 235 in the rack bore, and the friction and steering loads that rotate the pitman shaft 240. As a result, the valve assembly 215 is actuated, generating assist pressure in either cavity A 220 or cavity B 225, depending on the direction that the torque is applied. When the torque and pressure get high enough to overcome the resisting forces on the rack 235, the rack 235 moves and rotates the pitman shaft 240, and ultimately steers the vehicle. In this scenario, the driver feels the torque buildup, which provides a feeling for where the center position is in the vehicle.

When lash develops between the rack teeth and the pitman shaft teeth, the friction of the rack 235 in the rack bore is reduced. The rack 235 has to move axially in the rack bore until the clearance is removed between the rack teeth and the pitman shaft teeth before the steering loads begin to resist motion of the rack 235. This creates a window of angular motion of the steering wheel 14 in which at least a portion of the torque is followed by a sharp increase in torque once the clearance in the teeth is removed. This creates an undesirable steering feel, such as a jerky, or disconnected steering feel. The condition described is typically referred to as a lash condition.

To improve such a condition, the technical solutions described herein utilize the MTO actuator 310 to apply pressure that opposes motion of the rack 235 when lash is present. When torque is applied in a direction that would pressurize the cavity A 220, the valve assembly 215 is actuated to provide pressure in the Cavity B 225 to resist motion of the rack 235. The driver thus has to increase the torque applied in order to move the rack 235, minimizing the torque buildup change between the on center lash condition, and the condition when the rack teeth and the pitman shaft teeth are engaged. When torque is applied in a direction that would pressurize the cavity B 225, the valve assembly 215 is actuated to provide pressure in the cavity A 220 to resist motion of the rack 235, providing the same effect in the other direction.

Figure 5:
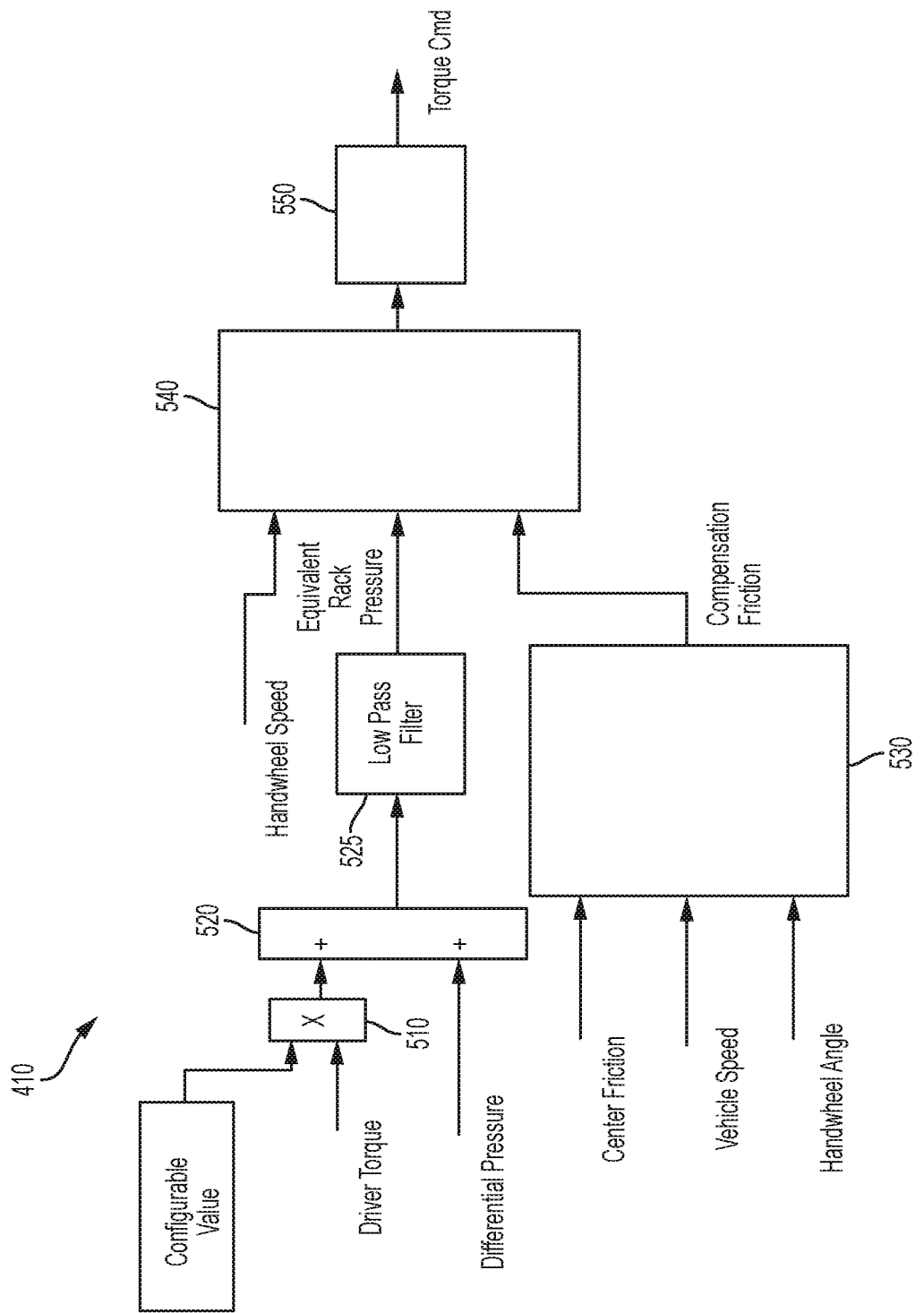
FIG. 5 shows a block diagram of example modules for providing MTO lash compensation in a steering gear, according to one or more embodiments.
Figure 6:
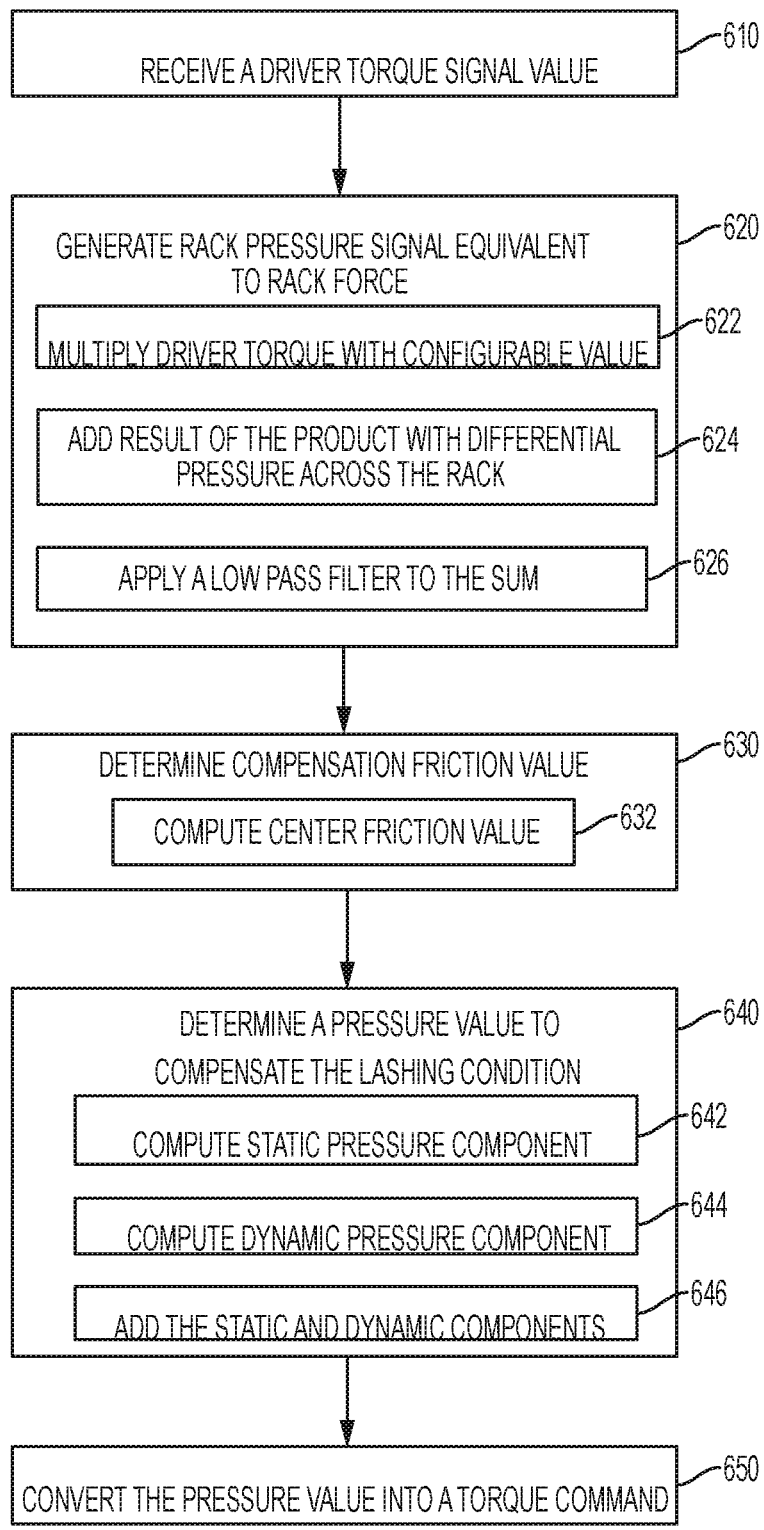
FIG. 6 illustrates a flowchart of an example method for providing MTO lash compensation in a steering gear, according to one or more embodiments.

FIG. 5 shows a block diagram of example modules for providing an MTO lash compensation. FIG. 6 illustrates a flowchart of an example method for providing the MTO lash compensation. It is understood that in one or more embodiments the modules used to implement the method for MTO lash compensation may be different from those illustrated in FIG. 5. Further, it is understood that in one or more embodiments, the operations illustrated in FIG. 6 may be performed in a different order.

Referring to FIG. 6, the method for providing the MTO lash compensation includes receiving a driver torque signal, as shown at 610. In one or more embodiments, the driver torque signal provides a measured value of the driver torque, such as measured using a torque measurement sensor. Alternatively, the driver torque signal provides the estimated driver torque value.

The method further includes computing a rack pressure signal that is equivalent to a rack force corresponding to the driver torque, as shown at 620. In one or more embodiments, the driver torque signal is multiplied by a configurable value using a multiplier module 510, as shown at 622. The multiplier module 510, using the configurable value, generates a pressure signal that is input to an adder module 520. The adder module 520 adds the computed pressure signal, corresponding to the driver torque signal, and a measured differential pressure across the rack 235 to generate the equivalent rack pressure signal, as shown at 624. In one or more embodiments, a low pass filter 525 is applied to the sum, providing the equivalent rack pressure signal, as shown at 626.

The method further includes determining, using, a friction module 530, a compensation friction value, as shown at 630. The friction module 530 receives input signals to generate the compensation friction, the input signals including a vehicle speed signal, a handwheel angle signal, and a center friction signal.

In one or more embodiments, determining the compensation friction value includes determining the center friction value, as shown at 632. The center friction value represents a magnitude that compensates an occurrence of lashing conditions in the gear 300 due to friction. In one or more embodiments, the center friction value is a predetermined value, which is configurable prior to initiation of the method. Alternatively, the center friction value is a variable signal that is dynamically configured. For example, the center friction value represents an increased usage. Alternatively or in addition, a learning algorithm determines the friction of the steering system, and in turn, the center friction value is determined based on the result of the learning algorithm. An example of variable signal could be a signal that increments with each ignition cycle, or one that increases with vehicle mileage. For example, in response to each ignition cycle of the vehicle that is equipped with the steering system, the center friction value is incremented by a predetermined value. Alternatively, the center friction value is incremented by the predetermined value after a predetermined number of ignition cycles. Alternatively or in addition, upon ignition of the vehicle, the control module 40 determines a number of miles travelled (mileage) by the vehicle and configures the center friction value accordingly. In one or more embodiments, the control module 40 may store a look up table or any other data structure or algorithm that determines the center friction value corresponding to the mileage.

Alternatively, or in addition, the center friction value is determined based on one or more sensor measurements. For example, the steering system 12 may be configured with a predetermined target value for the center friction value, which may be specific for the vehicle 10, and/or the steering system 12. The control module 40 may accordingly adjust the center friction value to maintain the center friction value as per the target value. For example, as the lash condition develops the center friction value of the steering system 12 may reduce. The control module 40 monitors the center friction value and compares the measured value with the target value. The control module 40, based on the difference, adjusts the center friction value to meet the target value. For example, the control module 40 receives pressure measurements, while steering, for the two cavities A and B (220 and 225). As the lash condition develops, the center friction value reduces, and the pressure difference between the two cavities reduces in magnitude while steering. In one or more examples, the control module uses the difference as the center friction value, and/or to increment the center friction value. Thus, as the lash condition develops, the control module 40 applies different center friction values based on the pressure measurements in the cavities A and B (220 and 225).

Figure 7:
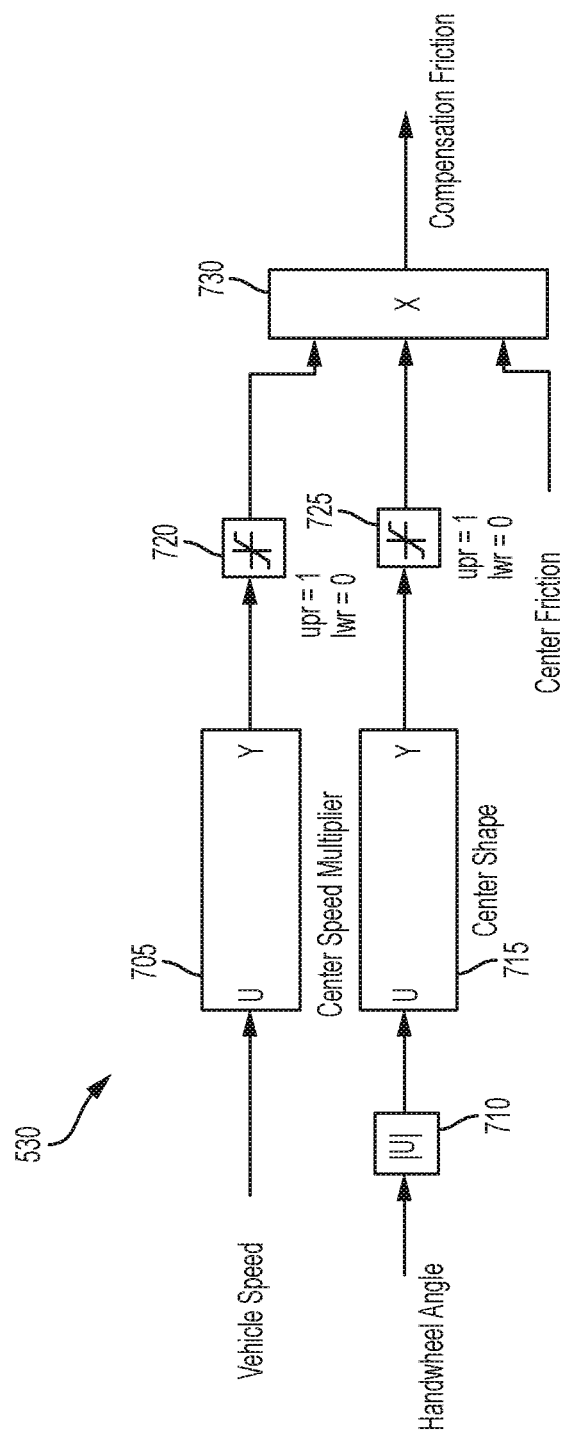
FIG. 7 illustrates an example block diagram and dataflow a friction module, according to one or more embodiments.

FIG. 7 illustrates an example block diagram and dataflow within the friction module 530. The friction module 530 includes, among other components, a center-speed multiplier module 705, an absolute value module 710, a center shape module 715, one or more limiting modules 720 and 725, and a compensation friction multiplier module 730. In one or more embodiments, the vehicle speed signal is used as an input to the center speed multiplier module 705. The center speed multiplier module 705 may include a lookup table that outputs a scale factor based on the input vehicle speed signal. The limiting module 720 limits the scale factor within a predetermined range, such as 0 to 1.

In one or more embodiments, the handwheel angle is used as an input to the center shape module 715. In one or more examples, the modulo module 710 determines and outputs an absolute value of the handwheel angle signal prior to inputting the handwheel angle signal to the center shape module 715. In one or more embodiments, the center shape module uses a lookup table to output a scale factor based on the input handwheel angle signal. The limiting module 725 limits the scale factors within a predetermined range, such as 0 to 1.

The two scale factors, one from the center speed multiplier module 705, and one from the center shape module 715, are multiplied by each other along with the center friction value by the compensation friction multiplier module 730. The resulting product provides the compensation friction value for the operating condition represented by the vehicle speed and handwheel angle.

Referring back to the flowchart in FIG. 6, the method further includes determining, using a pressure module 540, a pressure value to compensate for the lashing condition, as shown at 640. The pressure value is determined based on a handwheel speed signal, the equivalent rack pressure value, and the compensation friction value from the friction module 530.

Figure 8:
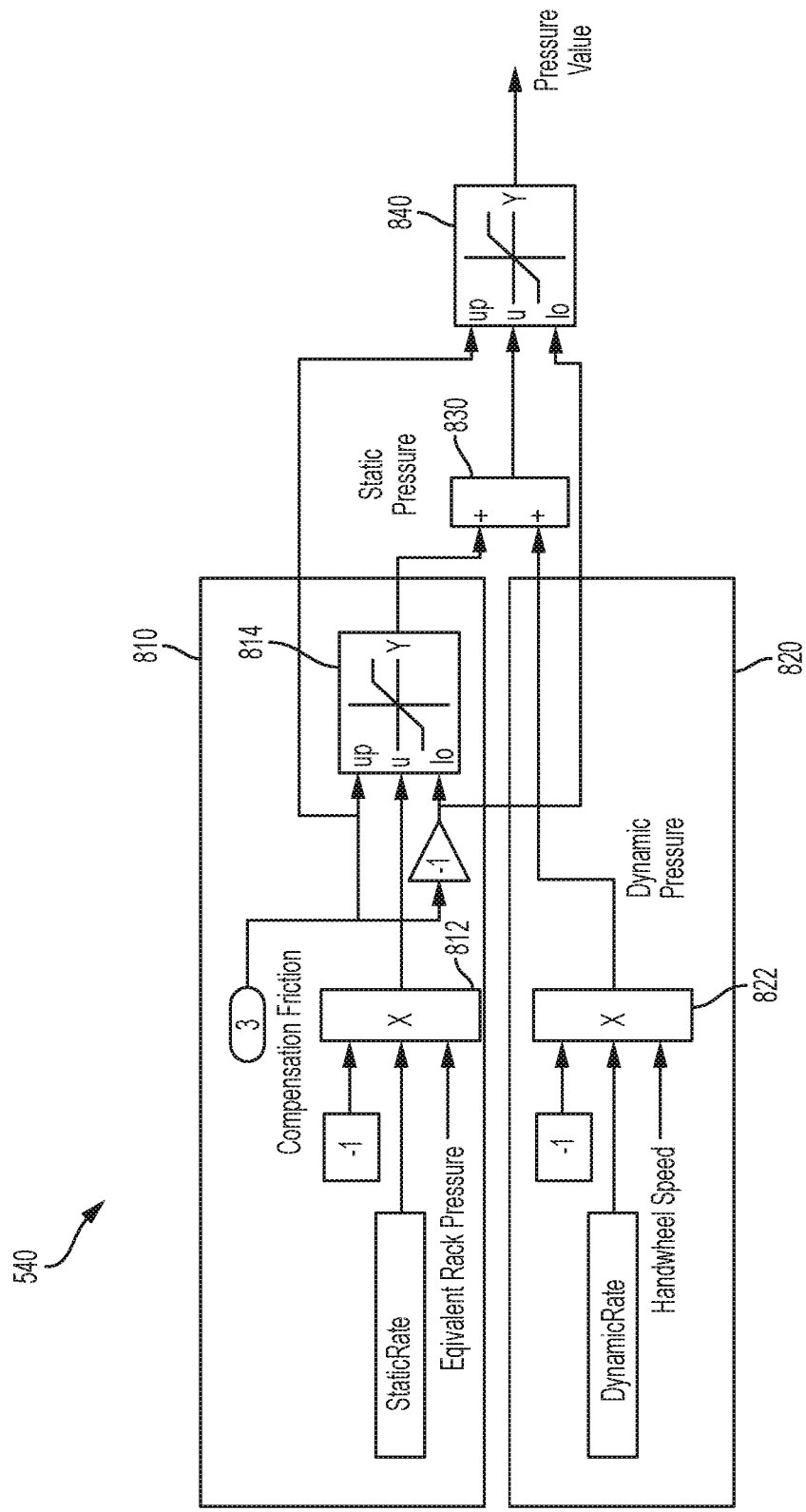
FIG. 8 illustrates an example block diagram of a pressure module, according to one or more embodiments.

FIG. 8 illustrates an example block diagram of the pressure module 540. In one or more embodiments, the pressure module 540 includes, among other components, a static component 810 and a dynamic component 820. The static component 810 determines a static-pressure value, as shown at 642 (FIG. 6). The static component 810 computes the static-pressure value by multiplying a predetermined value, such as −1, with the product of a predetermined static rate calibration value, and the equivalent rack pressure signal. In one or more examples, the predetermined static rate calibration value ranges between 0 and 1. The static component 810 includes a multiplier 812 that performs the above multiplication. The static component 810 may further include a limiting module 814 that limits the static-pressure value to +1—the compensation friction signal value.

The dynamic component 820 determines a dynamic-pressure value, as shown at 644 (FIG. 6). The dynamic component 820 computes the dynamic-pressure value by multiplying by a predetermined value, such as −1, the product of a predetermined dynamic rate calibration value, and the handwheel speed signal. The predetermined dynamic rate calibration value is a number greater than 0, such as 1, 5, 10, 0.5, 1.6, or any other positive value. The dynamic component includes a multiplier module 822 that performs the above multiplication.

The pressure module 540 further includes an adder 830 that computes a sum of the static-pressure value and the dynamic-pressure value, as shown at 646 (FIG. 6). In one or more embodiments, a limiting module 840 limits the resulting sum to +1—the compensation friction signal value to determine the pressure value signal.

Referring back to FIG. 6, the pressure value is supplied to a pressure to torque conversion module 550 that generates a torque command signal. The torque command is added to the MTO torque command in FIG. 4. In one or more embodiments, the pressure to torque conversion module 550 uses a look up table or any other conversion algorithm to determine the amount of torque that produces the pressure represented by the pressure value.

Accordingly, the torque command that is added to the MTO torque command compensates for the lashing condition that may occur in the gear 300. Further, by generating the torque command using the one or more examples described herein, adjusting the gear periodically for compensating the lashing is reduced in frequency, if not entirely eliminated. Thus, the technical solutions described herein improves the operation of the steering system.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood

Having thus described the invention, it is claimed:

1. A method for compensating for lash in a steering system, the method comprising:
   determining a rack pressure value based on a driver torque value and a differential pressure across a rack of the steering system;
   determining a center friction value based on a difference between a first pressure value and a second pressure value, the first pressure value being a pressure measurement across a first cavity in a ball steering gear of the steering system, and the second pressure value being a pressure across a second cavity in the ball steering gear;
   computing a pressure value based on the rack pressure value and the center friction value, wherein computing the pressure value further includes:
      determining a dynamic pressure value based on a speed of the handwheel of the steering system, wherein determining the dynamic pressure value comprises multiplying the speed of the handwheel by a predetermined scaling factor; and
      adding a static pressure value and the dynamic pressure value to compute the pressure value; and
   generating a torque command using the pressure value, the torque command being added to the driver assist torque for the steering system.

2. The method of claim 1, further comprising determining a compensation friction value based on the center friction value for the steering system, wherein the center friction value represents a magnitude of pressure to compensate for the lash.

3. The method of claim 2, wherein the center friction value is incremented by a predetermined step value in response to a specific number of ignition cycles of the vehicle that is equipped with the steering system.

4. The method of claim 2, wherein the center friction value is incremented by a predetermined step value in response to each ignition of the vehicle that is equipped with the steering system.

5. The method of claim 2, further comprising configuring the center friction value based on a mileage of the vehicle.

6. The method of claim 1, wherein the driver torque value is an estimated driver torque value.

7. The method of claim 1, wherein computing the pressure value further comprises determining static pressure value based on the rack pressure value.

8. The method of claim 1, wherein determining the static pressure value comprises multiplying the rack pressure value by a predetermined scaling factor and limiting the result by a compensation friction value.

9. The method of claim 1, wherein computing the pressure value further comprises limiting the result of adding the static pressure value and the dynamic pressure value within a range that is defined by positive and negative value of a compensation friction value.

10. A steering system comprising:
   a ball steering gear that comprises a first cavity and a second cavity; and
   a control module configured to compensate for lash in the steering system by performing a method comprising:
      determining a rack pressure value based on a driver torque value and a differential pressure across a rack of the steering system;
      determining a center friction value based on a difference between a first pressure value and a second pressure value, the first pressure value being a pressure measurement across the first cavity, and the second pressure value being a pressure across the second cavity;
      computing a pressure value based on the rack pressure value and the center friction value, wherein computing the pressure value further comprises:
         determining a static pressure value based on the rack pressure value;
         determining a dynamic pressure value based on a speed of the handwheel of the steering system, wherein determining the dynamic pressure value comprises multiplying the speed of the handwheel by a predetermined scaling factor; and
         adding the static pressure value and the dynamic pressure value to compute the pressure value; and
      generating a torque command using the pressure value, the torque command being added to the driver assist torque for the steering system.

11. The steering system of claim 10, wherein the control module is further configured to increment the center friction value by a predetermined step value in response to a specific number of ignition cycles of the vehicle equipped with the steering system, wherein a compensation friction value is determined further based on the center friction value.

12. The steering system of claim 10, wherein the control module is further configured to initiate the center friction value based on a mileage of the vehicle, wherein a compensation friction value is determined further based on the center friction value.

13. The steering system of claim 10, wherein determining the static pressure value comprises multiplying the rack pressure value by a predetermined scaling factor and limiting the result by a compensation friction value.

14. The steering system of claim 10, wherein computing the pressure value further comprises limiting the result of adding the static pressure value and the dynamic pressure value within a range that is defined by positive and negative value of the compensation friction value.

15. A computer program product comprising a memory device having computer executable instructions stored therein, the computer executable instructions when executed by a processing unit cause the processing unit to perform a method to compensate for lash in a steering system, the method comprising:
   determining a rack pressure value based on a driver torque value and a differential pressure across a rack of the steering system;
   determining a center friction value based on a difference between a first pressure value and a second pressure value, the first pressure value being a pressure measurement across a first cavity in a ball steering gear of the steering system, and the second pressure value being a pressure across a second cavity in the ball steering gear;
   determining a static pressure value based on the rack pressure value;
   determining a dynamic pressure value by multiplying a speed of the handwheel by a predetermined scaling factor;
   computing a pressure value by adding the static pressure value and the dynamic pressure value; and
   generating a torque command using the pressure value, the torque command being added to the driver assist torque for the steering system.

* * * * *